United States Patent [19]
Ulanovsky

[11] 3,946,755
[45] Mar. 30, 1976

[54] CLIMB AND DIVE VALVE

[75] Inventor: Jack M. Ulanovsky, Costa Mesa, Calif.

[73] Assignee: Parker-Hannifin Corporation, Cleveland, Ohio

[22] Filed: May 5, 1975

[21] Appl. No.: 574,505

[52] U.S. Cl. .............................................. 137/493
[51] Int. Cl.² ...................................... F16K 31/385
[58] Field of Search .............. 137/493, 87; 220/88 B

[56] References Cited
UNITED STATES PATENTS
3,587,618  6/1971  Kenyon ............................... 137/87

Primary Examiner—Henry T. Klinksiek
Attorney, Agent, or Firm—Donnelly, Maky, Renner & Otto

[57] ABSTRACT

A climb and dive valve for use as in a pressurized aircraft fuel tank characterized in that the movable valve member thereof is opened to vent the fuel tank in response to predetermined increase in tank pressure with respect to ambient pressure, and is opened by a valve actuator to admit ambient air into the fuel tank in response to predetermined decrease in tank pressure with respect to ambient pressure.

8 Claims, 1 Drawing Figure

U.S. Patent  March 30, 1976  3,946,755
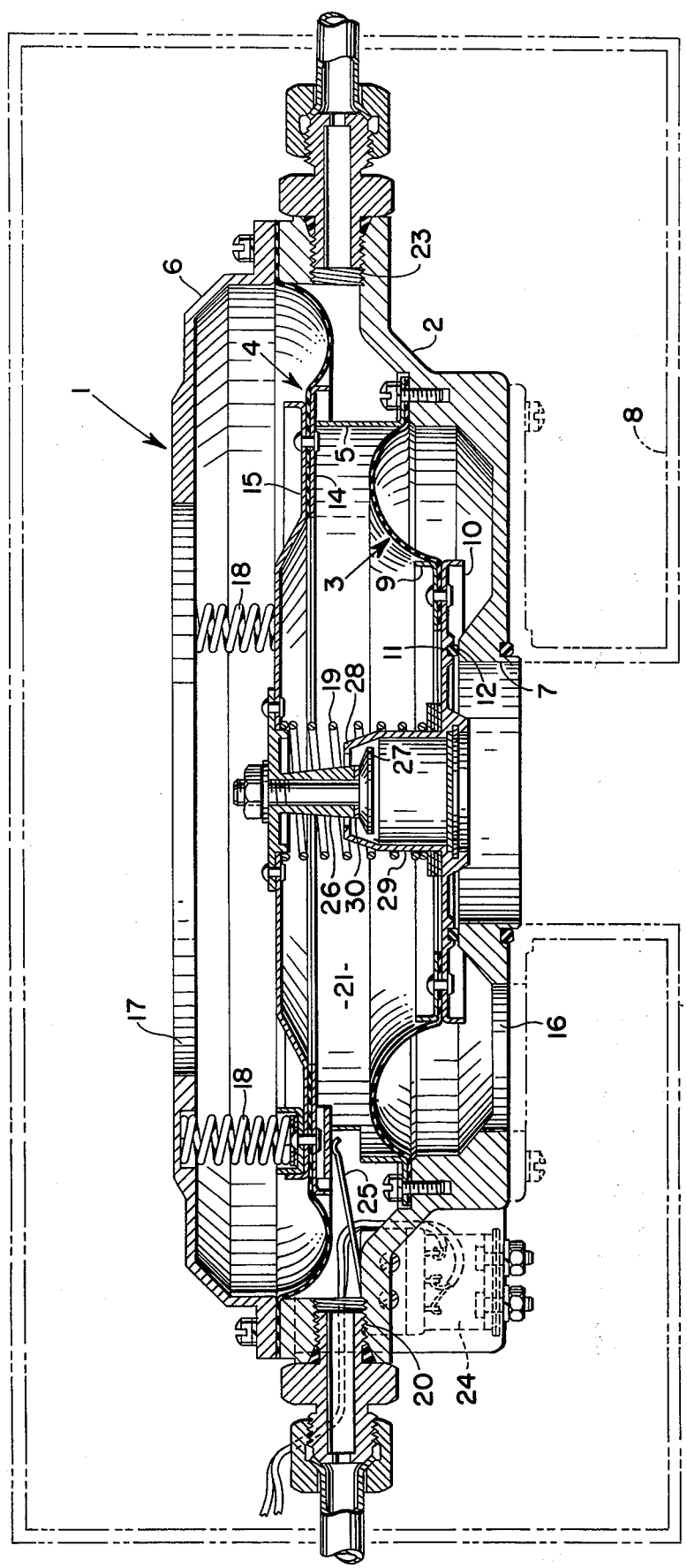

CLIMB AND DIVE VALVE

BACKGROUND OF THE INVENTION

It is known as from U.S. Pat. Nos. 3,587,618, 3,595,559, 3,628,758, 3,693,915, 3,710,549, 3,732,668, 3,788,039, 3,788,040, and 3,830,307 to provide a vent valve, relief valve, or combination vent and relief valve in conjunction with an aircraft fuel tank inerting system in which an inert gas, such as nitrogen, is employed to pressurize the fuel tank and to maintain the oxygen content of the ullage gases at a level to prevent fire and explosion. Heretofore, such combination vent and relief valve, also commonly referred to as a climb and dive valve has comprised separate valve elements of which the vent valve element opens as during descent of the aircraft to admit ambient air into the fuel tank in the event of insufficient rate of flow of inert gas into the fuel tank, and of which the relief valve opens as during ascent of the aircraft to prevent the tank pressure-ambient pressure differential from exceeding a predetermined value.

SUMMARY OF THE INVENTION

It is a principal object of this invention to provide a climb and dive valve which is of simple and compact construction and which is foolproof in operation, said valve being characterized in the provision of a single valve element which cooperates with a seat encircling an ambient pressure port to maintain aircraft fuel tank pressures within predetermined positive and negative pressures with respect to varying ambient pressures during flight of the aircraft.

It is another object of this invention to provide a climb and dive valve which is capable of being preflight checked simply by pressurizing the ambient pressure port with a predetermined pressure and monitoring the operation of the valve by a position switch.

Other objects and advantages will appear from the ensuing description.

BRIEF DESCRIPTION OF THE DRAWING

The single FIGURE of the drawing is a cross-section view substantially diametrically through a climb and dive valve embodying the present invention.

DETAILED DESCRIPTION OF A PREFERRED EMBODIMENT

The climb and dive valve 1 herein comprises a housing member 2 to which the outer peripheral portions of flexible diaphragm assemblies 3 and 4 of different diameter are respectively clamped by the flange of a stop ring 5 and the flange of a cover member 6. The housing member 2 has a central ambient pressure port 7 which, when the valve 1 is mounted in a vent duct 8 having communication with the vapor space of a fuel tank, is exposed to ambient pressure.

The inner peripheral portion of the smaller diaphragm 3 is clamped between a ring 9 and a valve member 10 which are riveted together, and the latter carries a resilient gasket 11 which cooperates with the seat 12 encircling the ambient pressure port 7. The inner peripheral portion of the larger diaphragm 4 is clamped between a ring 14 and a closure plate 15 which are riveted together. The housing 2 and cover 6 have openings 16 and 17 as shown to expose the underside of the smaller diaphragm 3 around the seat 12 and the upper side of the larger diaphragm 4 to tank pressure. A plurality of springs 18 are compressed between the cover 6 and the larger diaphragm assembly 4 to urge the latter into engagement with the upper end of the stop ring 5, and a spring 19 compressed between the central portion of the larger diameter diaphragm assembly 4 and the valve member 10 urges the valve member 10 into engagement with the seat 12 to close communication of tank pressure with the atmosphere.

The housing 2 has a sensing port 20 which has a conduit connected thereto which is exposed to ambient pressure and through which the chamber 21 between the diaphragm assemblies 3 and 4 is subjected to ambient pressure. The housing 2 also has an override port 23 which is connected to a suitable pressure source to unseat the valve member 10 whenever desired. The housing 2 also carries a switch 24 which is actuated upon predetermined initial movement of the larger diameter diaphragm assembly by the switch operating lever 25 which is engaged with diaphragm assembly 4.

The larger diameter diaphragm assembly 4 has a central valve actuator 26 which has a radially outwardly extending flange 27 disposed beneath the inturned flange 28 of an upward extension 29 at the center of the smaller diaphragm assembly 3 and the clearance between said flanges is adjusted as by shims 30 to provide, say a 0.015 to 0.025 inch gap when the larger diameter diaphragm assembly 3 is engaged with the upper end of the stop ring 5. Similarly, shims as shown may be employed in association with the springs 18 and 19 to adjust and balance the loading of assembly 4 and to predeterminedly preload assembly 3.

The valve 1 is normally closed and when tank pressure increases to a predetermined level greater than ambient pressure, 0.5 psi for example, the tank pressure acting on the upper side of a larger diaphragm assembly 4 together with springs 18 maintains the same in engagement with the stop ring 5, and the tank pressure acting on the annular area on the under side of the smaller diaphragm assembly 3 overcomes the force of spring 19 and ambient pressure in the chamber 21 whereby the spring 19 is compressed to allow upward opening movement of the valve member 10 thus to relieve such excessive tank pressure through the ambient pressure port 7 of the housing 2. Thus, during climbing of the aircraft and consequent decreasing ambient pressure, the tank pressure is relieved whenever it exceeds ambient pressure by 0.5 psi.

On the other hand, as during descent of the aircraft and during withdrawal of fuel from the tank it is desired that the tank pressure be not less than a predetermined level lower than ambient pressure, say 0.25 psi, and in the case of a negative tank pressure of more than 0.25 psi lower than ambient pressure, the ambient pressure in the chamber 21 between the diaphragms 3 and 4 is effective because of the larger effective diameter of the diaphragm assembly 4 to move the larger diaphragm assembly 4 upwardly, first to take up the clearance between the flanges 27 and 28 and then to lift the valve member 10 away from the seat 12 to admit air into the fuel tank via ambient pressure port 7 and duct 8.

In an aircraft fuel tank inerting system regulator means are provided to supply inert gas into the vapor space of the fuel tank in order to maintain the tank pressure within a specified range but, in the event that the rate of flow of inert gas into the tank is insufficient then the valve 1 herein is effective to admit air into the tank to prevent an excessive ambient pressure to tank pressure differential.

As evident, the construction herein is compact and simple and there are no sliding parts which would vary the operating characteristics and moreover the diaphragm assemblies 3 and 4 are inherently self-centering. With reference to preflight checking of the valve 1 herein, an air pressure source may be connected to the port 7 and to the sensing port 20 and when the applied pressure at the ports 7 and 20 exceeds 0.25 psi above ambient pressure, the upper diaphragm assembly 4 should commence to move upwardly from stop ring 5 and predetermined movement (e.g. 0.020 to 0.080 inch) will be monitored by the actuation of the switch 24. Should it be found desirable to open the valve 1 at will irrespective of the ambient pressure and tank pressure differentials being within desired limits, the sensing port 20 may be closed and air pressure from a suitable source is admitted through the orifice 31 into the chamber 21 to build up sufficient pressure therein to cause the upper diaphragm assembly 4 to move upwardly to lift the valve member 10 out of engagement with the seat 12 to equalize ambient and tank pressures.

Although the valve 1 is herein described in relation to an aircraft fuel tank inerting system utilizing inert gas for pressurizing the tank, it may be used with a pressurized aircraft fuel tank in which the pressurizing medium is air, or with any tank to maintain ambient pressure and tank pressure differentials within predetermined limits.

The embodiments of the invention in which an exclusive property or privilege is claimed are defined as follows:

1. A valve assembly comprising a housing having ports respectively exposed to different fluid pressure sources; a valve member movable in said housing to open and close fluid communication between ports exposed to such different fluid pressure sources; said valve member being spring-biased in a direction to close such fluid communication and having areas on opposite sides thereof exposed to the respective fluid pressure sources whereby predetermined predominance of one source relative to the other source overcomes said spring bias to move said valve member to open communication between said ports; an actuator spring-biased to a stop position in said housing and movable away from said stop position to engage said valve member to move the latter to open such fluid communication in response to predetermined predominance of said other source with respect to said one source; said actuator having areas on opposite sides thereof larger than those of said valve member exposed to the respective sources.

2. The valve of claim 1 wherein said valve member and said actuator comprise coaxial axially spaced-apart diaphragm assemblies having their outer peripheral portions clamped in said housing, the central portion of said valve member diaphragm assembly constituting a valve portion which cooperates with a seat encircling a port having fluid communication with said other source and through which fluid flows in one direction or the other according to which fluid pressure source predominates; said actuator diaphragm assembly being of larger diameter than said valve member diaphragm assembly with the sides of said diaphragms remote from each other being exposed to said one fluid pressure source and with the space between said diaphragms being exposed to said other fluid pressure source; said diaphragm assemblies having overlapping portions to transmit movement of said actuator diaphragm assembly away from said stop means to said valve member diaphragm assembly as aforesaid by predetermined predominance of said other source with respect to said one source.

3. The valve of claim 2 in which said housing has a port for fluid communication with another source of magnitude greater than said one and other sources and leading into the space between said diaphragm assemblies to move said actuator diaphragm assembly away from said stop position as aforesaid independently of said one and other sources.

4. The valve of claim 2 wherein said housing has switch means to detect such movement of said actuator diaphragm assembly.

5. A valve assembly comprising a housing having an ambient pressure port with a surrounding valve seat; a valve member diaphragm assembly having a central portion which cooperates with said seat to open and close said port; a stop ring through which the outer peripheral portion of said valve member diaphragm assembly is clamped in said housing; an actuator diaphragm assembly of larger diameter than said valve member diaphragm assembly disposed in coaxial and axially spaced relation to said valve member diaphragm assembly; a cover member secured to said housing to clamp the outer peripheral portion of said actuator diaphragm assembly; said housing having a sensing port exposed to ambient pressure leading to a chamber in said housing defined between said diaphragm assemblies; spring means between said cover member and said actuator diaphragm assembly yieldably urging the latter against said stop ring and spring means between said diaphragm assemblies yieldably urging said valve portion into engagement with said seat; said housing and cover member having openings adapted to expose the sides of said diaphragm assemblies which are remote from each other to fuel tank ullage gas pressure whereby predetermined predominance of fuel tank pressure with respect to ambient pressure in said chamber retains said actuator diaphragm assembly against said stop ring while said valve member diaphragm assembly is moved away from said seat for outflow through said ambient pressure port, and whereby predetermined predominance of ambient pressure in said chamber with respect to fuel tank pressure moves said actuator diaphragm assembly away from said stop means into engagement with said valve member diaphragm assembly away from said seat for inflow through said ambient pressure port.

6. The valve of claim 5 wherein said diaphragm assemblies have radially overlapped portions through which movement of said actuator diaphragm assembly away from said stop ring is imparted to said valve diaphragm assembly.

7. The valve of claim 5 in which said housing has an override port through which fluid pressure may be admitted at will to establish a predominance of fluid pressure in said chamber to move said actuator diaphragm assembly as aforesaid independent of relative ambient pressure and tank pressure.

8. The valve of claim 5 wherein said housing has switch means operated by said actuator diaphragm assembly to check at what chamber pressure in excess of ambient pressure on said remote sides the actuator diaphragm assembly moves to facilitate prechecking of said valve.

\* \* \* \* \*